United States Patent
Chien et al.

(10) Patent No.: US 8,526,890 B1
(45) Date of Patent: Sep. 3, 2013

(54) RADIO FREQUENCY MODULES CAPABLE OF SELF-CALIBRATION

(75) Inventors: Lien Chien, Hsinchu (TW); Hsin-Ying Lee, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 45 days.

(21) Appl. No.: 13/417,314

(22) Filed: Mar. 11, 2012

(51) Int. Cl.
*H04B 17/00* (2006.01)

(52) U.S. Cl.
USPC ..................... 455/67.11; 455/115.1

(58) Field of Classification Search
USPC ............ 455/67.11, 115.1, 91, 550.1, 67.14; 375/295, 135, 136
See application file for complete search history.

(56) References Cited

U.S. PATENT DOCUMENTS

| | | | |
|---|---|---|---|
| 7,436,679 B2 * | 10/2008 | Iijima et al. | 361/760 |
| 7,672,668 B2 * | 3/2010 | Ding et al. | 455/423 |
| 8,229,376 B2 * | 7/2012 | Li et al. | 455/127.2 |
| 8,238,469 B2 * | 8/2012 | Busson et al. | 375/295 |

* cited by examiner

*Primary Examiner* — Sonny Trinh
(74) *Attorney, Agent, or Firm* — Winston Hsu; Scott Margo

(57) ABSTRACT

A radio frequency (RF) module capable of self-calibration is provided. According to an embodiment, the RF module includes an RF signal processor, a plurality of RF signal paths, an antenna switch module (ASM), and a power detector. The RF signal paths are connected between the RF signal processor and the ASM. The ASM has an antenna port and selectively connects the RF signal processor to the antenna port through one of the RF signal paths. The power detector is operative to detect power of an RF transmission signal that exits the antenna port of the ASM and enters an antenna when the ASM connects an RF transmission path of the RF signal paths to the antenna port of the ASM.

17 Claims, 10 Drawing Sheets

RADIO FREQUENCY MODULES CAPABLE OF SELF-CALIBRATION

BACKGROUND

1. Technical Field

The invention relates generally to radio frequency (RF) modules, and more particularly, to RF modules capable of self-calibration.

2. Related Art

Wireless communications has gradually become a basic function of electronic devices, especially for portable ones. An electronic device capable of performing wireless communications generally includes a radio frequency (RF) module operative to handle RF signals. The RF module includes several electronic components. These components are frequently manufactured through mass production and as a result may not conform to their specifications precisely. For example, as compared with an ideal model, an RF module may be different on a transmission path as a whole, or on some sub-bands of the transmission path. As a result, the power level of the transmitted RF signal may deviate from the desired power level. Furthermore, as compared with the ideal model, the RF module may be different on a receiving path as a whole, or on only some sub-bands of the receiving path. As a result, the actual loss caused by the receiving path may deviate from the expected amount.

In response, several calibration mechanisms have been proposed. However, some of the mechanisms require too many additional components to be used, and hence significantly increase the overall hardware costs. Some of the mechanisms calibrate only a part of an RF signal path, which can be a transmission or receiving path, but does not compensate for the variance attributable to the rest part of the RF signal path. For example, if the RF module includes an antenna switch module (ASM) that allows a single antenna to be shared by several RF signal paths, the ASM will be a source of power/loss variations but the power/loss variations attributable to the ASM are seldom calibrated.

SUMMARY

Embodiments of radio frequency (RF) modules capable of self-calibration are proposed to resolve the aforementioned problems of the related art and to achieve some other objectives.

One of the proposed RF modules includes an RF signal processor, a plurality of RF signal paths, an antenna switch module (ASM), and a power detector. The RF signal paths are connected between the RF signal processor and the ASM. The ASM has an antenna port and selectively connects the RF signal processor to the antenna port through one of the RF signal paths. The power detector is operative to detect power of an RF transmission signal that exits the antenna port of the ASM and enters an antenna when the ASM connects an RF transmission path of the RF signal paths to the antenna port of the ASM.

Another one of the proposed RF modules includes an RF signal processor, a plurality of RF signal paths, an ASM, and a test tone generator. The RF signal paths are connected between the RF signal processor and the ASM. The ASM has an antenna port and selectively connects the RF signal processor to the antenna port through one of the RF signal paths. The test tone generator is operative to generate a test tone and feed the test tone into the antenna port of the ASM when the ASM connects the antenna port to an RF receiving path of the RF signal paths.

Still another one of the proposed RF modules includes an RF signal processor, a plurality of RF signal paths, and an ASM. The RF signal paths are connected between the RF signal processor and the ASM. The ASM has an antenna port and selectively connects the RF signal processor to the antenna port through one of the RF signal paths. A calibration component of the RF signal processor facilitates the calibration of at least one of the RF signal paths.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
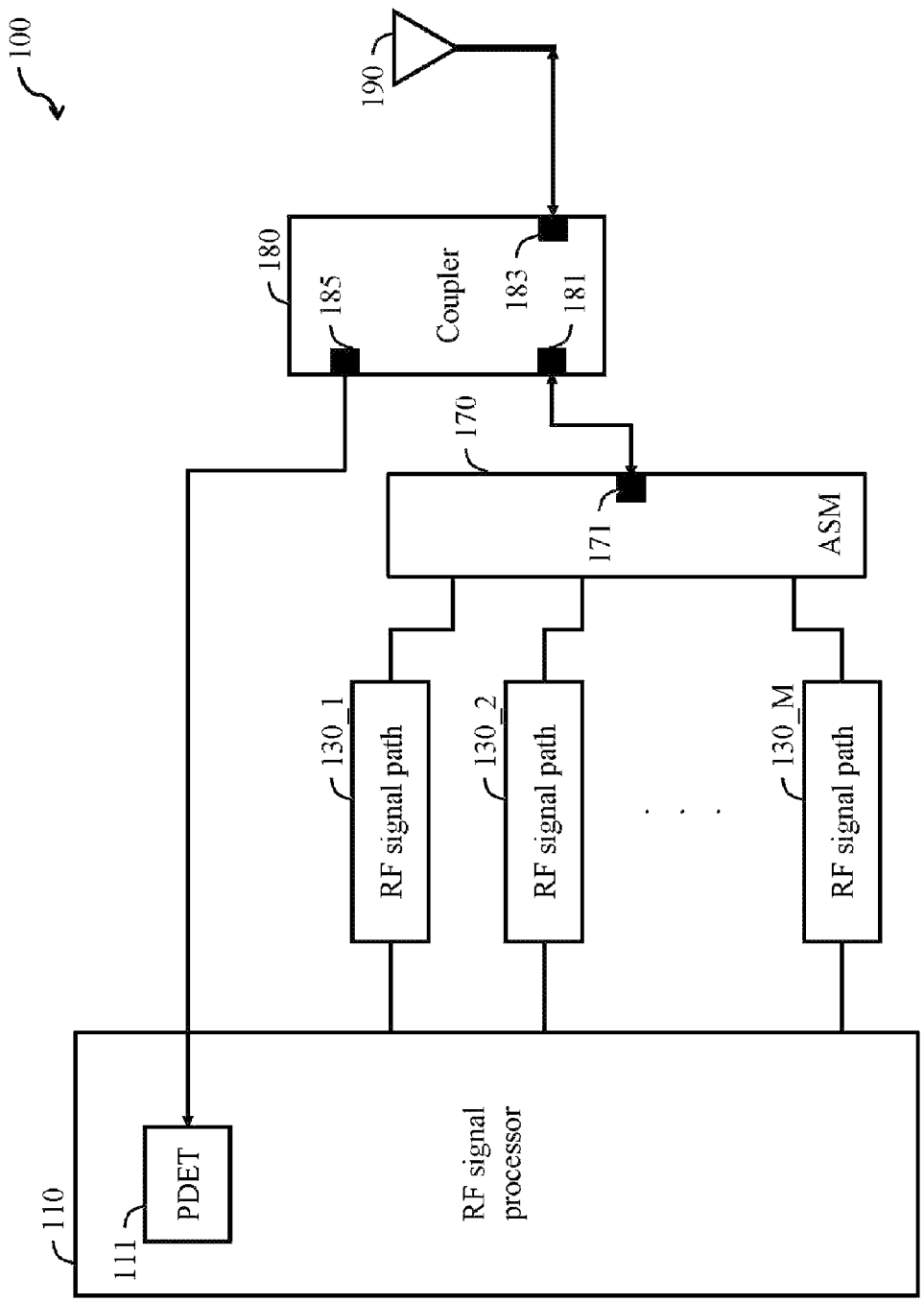
FIGS. 1-10 show block diagrams of radio frequency (RF) modules according to ten exemplary embodiments of the invention.

FIG. 1 shows a block diagram of a radio frequency (RF) module according to a first embodiment of the invention. As used in this detailed description, the term "RE module" refers to an electronic module that can be incorporated into an electronic device to generate and transmit RF signals, or to receive and process RF signals, or to be responsible for both the transmission and reception of RF signals. In addition to the RF module, the electronic device can further include other components, such as a baseband circuitry that controls the operation of the electronic device as a whole.

In this embodiment, the RF module 100 includes an RF signal processor 110, a plurality of RF signal paths 130_1, 130_2, . . . , and 130_M, an antenna switch module (ASM) 170, a coupler 180, and an antenna 190, where M is a positive integer larger than one. The RF signal processor 110 has a power detector (PDET) 111 that is connected to the coupler 180. The power detector 111 serves as a calibration component of the RF signal processor 110 and facilitates the calibration of at least one of the RF signal paths 130_1~130_M.

As used in this detailed description, the term "RE signal processor" refers to an RF transmitter, an RF receiver, or an RF transceiver. In this embodiment, if the RF signal processor 110 is an RF transmitter, the RF signal paths 130_1~130_M will be transmission paths. That is, the RF signal paths 130_1~130_M receive RF signals from the RF signal processor 110 and output RF signals to the ASM 170 for transmission. If the RF signal processor 110 is an RF transceiver, the RF signal paths 130_1~130_M can include at least one RF transmission path and at least one RF receiving path. The RF transmission path receives RF signals from the RF signal processor 110 and outputs RF signals to the ASM 170; the RF receiving path receives RF signals from the ASM 170 and outputs RF signals to the RF signal processor 110.

Although not depicted in FIG. 1, the RF signal paths 130_1~130_M have various internal components. For example, if an RF signal path 130_N is an RF transmission path, where N is a positive integer equal to or smaller than M, the path 130_N can include a power amplifier (PA). If the RF signal path 130_N is an RF receiving path, the path 130_N can include a surface acoustic wave (SAW) filter. In addition, more than one of the RF signal paths 130_1~130_M, e.g. an RF transmission path and an RF receiving path of the paths 130_1~130_M, can share a duplexer. The shared duplexer either connects the RF transmission path to the ASM 170 or connects the ASM 170 to the RF receiving path.

The ASM 170 allows the multiple RF signal paths 130_1~130_M to share a single antenna 190. Specifically, the ASM 170 only selects and connects one of the RF signal paths 130_1~130_M to an antenna port 171 of the ASM 170 at a time. Because the antenna port 171 is connected to the antenna 190 through the coupler 180, the selected one of the RF signal paths 130_1~130_M will be able to send RF signals to the antenna 190 for transmission, or receive RF signals from the antenna 190 for processing.

The coupler 180 includes an input port 181, a transmitted port 183, and a coupled port 185. If RF signals enter the coupler 180 through the input port 181, a portion of the RF signals will leave the coupler 180 through the transmitted port 183, while another portion of the RF signals will leave the coupler 180 through the coupled port 185. If RF signals enter the coupler 180 through the coupled port 185, at least a portion of the RF signals will leave the coupler 180 through the input port 181. The coupler 180 can be realized by a directional coupler that has an input port, a transmitted port, a coupled port, and an isolated port. The isolated port can be terminated with a matched load. The input port, the coupled port, and the transmitted port of the directional coupler can serve as the input port 181, the coupled port 185, and the transmitted port 183 of the coupler 180, respectively, or serve as the coupled port 185, the input port 181, and the transmitted port 183 of the coupler 180, respectively.

The RF module 100 of this embodiment allows RF transmission path(s) of the RF signal paths 130_1~130_M to be calibrated in real time. Taking the RF signal path 130_K as an example and assuming that it's an RF transmission path, where K is a positive integer equal to or smaller than M, the frequency response of the RF signal path 130_K may not always be exactly the same as that of an ideal model. For example, this may be true if the RF transmission path 130_K, as manufactured, has variations from the ideal model. As another example, this may be true if the RF transmission path 130_K is not in a perfect environment or under a perfect condition, e.g. the RF transmission path 130_K has accumulated some heat and as a result can no longer function ideally. If the RF transmission path 130_K cannot function ideally, the power of the transmitted RF signal, either as a whole or on some sub-bands, may vary from the ideal transmission power level. The difference in power level may affect the communication quality. To resolve the problem, this embodiment allows the RF transmission path 130_K to be calibrated in real time, i.e. when the RF transmission path 130_K is in use.

When the RF transmission path 130_K is in use, the ASM 170 connects it to the antenna port 171. Through the antenna port 171 of the ASM 170 and the input port 181 and the transmitted port 183 of the coupler 180, RF transmission signals coming out from the RF transmission path 130_K reach and are transmitted by the antenna 190. In addition, the coupler 180 couples the RF transmission signals to generate coupled RF signals at the coupled port 185.

After the coupled RF signals reach the power detector 111, the power detector 111 detects the power level of the coupled RF signals. Theoretically, the power level of the coupled RF signals should be proportional to the power level of the RF transmission signals. Therefore, in effect, the power detector 111 inferentially detects the power of the RF transmission signals that leaves the ASM 170 and enters the antenna 190.

If the detected power level is lower than a reference level, whether as a whole or only on some sub-bands, the RF transmission path 130_K is not providing enough power amplification. In response, the RF module 100 can be calibrated to compensate for the insufficient amplification. If the detected power level is higher than the reference level, whether as a whole or only on some sub-bands, the RF transmission path 130_K is providing more amplification than expected. In response, the RF module 100 can be calibrated to deal with the excessive amplification, e.g. in order to reduce power consumption. The comparison, determination, calibration, or a combination thereof, mentioned in this paragraph can be performed by the RF signal processor 110 itself, or by a baseband circuitry that is connected to the RF signal processor 110.

Instead of using N power detectors, each being connected to the ASM 170 and one of N RF transmission paths of the M RF signal paths 130_1~130_M, where N is a positive integer equal to or smaller than M, this embodiment uses only one power detector 111 and only one coupler 180. Therefore, this embodiment does not involve much additional hardware costs. Furthermore, because the power detected by the power detector 111 reveals the power of the actually transmitted RF signal, which has been affected by not only the RF transmission path 130_K but also the ASM 170, errors in power level attributable to the ASM 170 will also be calibrated. On the contrary, if a power detector was connected to the transmission line between the RF transmission path 130_K and the ASM 170, the power detector would not be able to detect errors attributable to the ASM 170, so the errors attributable to the ASM 170 would remain un-calibrated.

Moreover, because the RF transmission paths of the RF signal paths 130_1~130_M can be calibrated in real time, it's possible that the manufacturer of the RF module 100 or the manufacturer of an electronic device that incorporates the RF module 100 can skip calibrating the RF transmission paths. After all, these paths will be calibrated when they are in actual use. Therefore, this embodiment has the potential of further reducing the manufacturer's overall costs.

Figure 2:
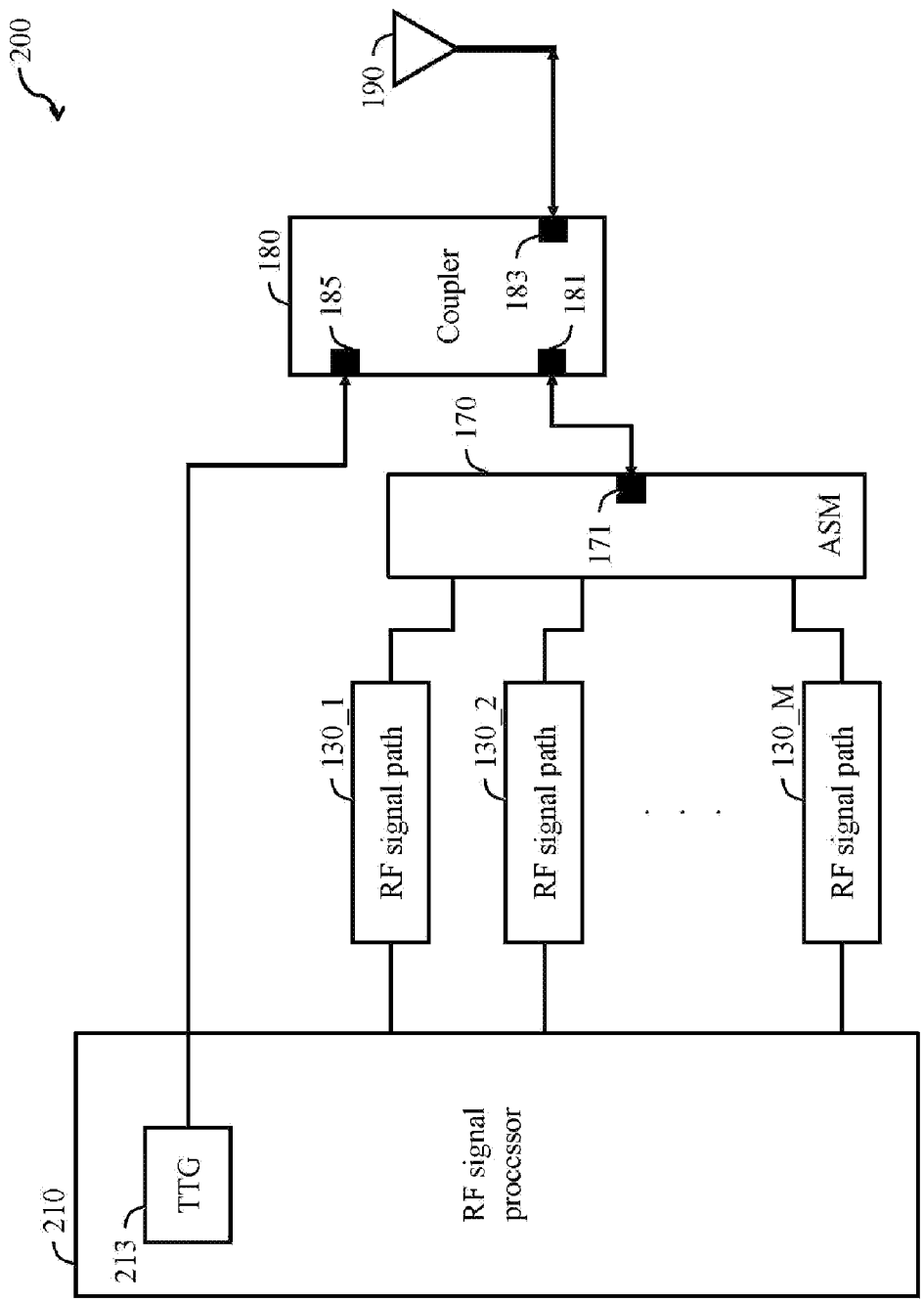

FIG. 2 shows a block diagram of an RF module according to a second embodiment of the invention. Except for a few differences, this embodiment is very similar to the embodiment shown in FIG. 1. For the sake of simplicity, only the differences between these two embodiments will be discussed hereinafter.

Please refer to FIG. 2. An RF module 200 of this embodiment includes an RF signal processor 210. Instead of having the power detector 111, the RF signal processor 210 has a test tone generator (TTG) 213. The test tone generator 213 serves as a calibration component of the RF signal processor 210 and facilitates the calibration of at least one of the RF signal paths 130_1~130_M. If the RF signal processor 210 is an RF receiver, the RF signal paths 130_1~130_M will be RF receiving paths. If the RF signal processor 210 is an RF transceiver, the RF signal paths 130_1~130_M can include at least one RF transmission path and at least one RF receiving path.

The RF module 200 of this embodiment allows RF receiving path(s) of the RF signal paths 130_1~130_M to be calibrated automatically, especially after an electronic device incorporating the RF module 200 has already been sold to an end user. Taking the RF signal path 130_L as an example and assuming that it's an RF receiving path, where L is a positive integer equal to or smaller than M, the frequency response of the RF receiving path 130_L may not be exactly the same as that of an ideal model. For example, this may be true if the RF receiving path 130_L, as manufactured, is different from its ideal model. As another example, this may be true if the RF receiving path 130_L is not in a perfect environment or is not under a perfect condition, e.g. it has accumulated some heat and as a result can no longer function ideally. If the RF receiving path 130_L cannot function ideally, it may cause more loss than expected. To resolve this problem, this embodiment allows the RF receiving path 130_L to be calibrated soon before it is going to be used.

To calibrate the RF receiving path 130_L, the ASM 170 needs to connect the antenna port 171 to the RF receiving path 130_L. The test tone generator 213 generates and feeds a test tone into the coupled port 185 of the coupler 180. To enable precise calibration, the power level of the test tone should be as close to a predetermined level as possible. The coupler 180 couples the test tone to generate a coupled test tone at the input port 181. Theoretically, the power level of the coupled test tone should be proportional to the power level of the test tone that enters the coupled port 185. Therefore, in effect, the test tone generator 213 is feeding the test tone, after some attenuation, into the antenna port 171 of the ASM 170.

After passing through the ASM 170 and the RF receiving path 130_L, the coupled test tone reaches the RF signal processor 210. The RF signal processor 210 then detects the power level of the received signal. If the detected power level is lower than a reference level, whether as a whole or only on some sub-bands, the RF receiving path 130_L and the ASM 170 are causing more loss than expected. In response, the RF module 200 can be calibrated to compensate for the excessive loss. If the detected power level is higher than the reference level, whether as a whole or only on some sub-bands, the RF receiving path 130_L and the ASM 170 are causing less loss than expected. If there is such a need, the RF module 200 can be calibrated to deal with the less-than-expected loss. The comparison, determination, calibration, or a combination thereof, mentioned in this paragraph can be performed by the RF signal processor 210 itself, or by a baseband circuitry that is connected to the RF signal processor 210.

The aforementioned calibration can be performed for all the RF receiving paths of the RF signal paths 130_1~130_M soon after the end user of an electronic device incorporating the RF module 200 has turned on the electronic device and before the RF receiving paths are used to pass RF signals containing useful information.

The RF module 200 of this embodiment has several advantages. For example, it uses only one test tone generator 213 and only one coupler 180 to allow all the RF receiving paths of the RF signal paths 130_1~130_M to be calibrated. Therefore, this embodiment does not involve much additional hardware costs. Furthermore, this embodiment allows the RF receiving paths of the RF signal paths 130_1~130_M to be calibrated when an electronic device incorporating the RF module 200 is already in an end user's hand. Therefore, it's possible that the manufacturer of the RF module 200 or the manufacturer of the electronic device incorporating the RF module 200 can skip calibrating the RF receiving paths. As a result, this embodiment has the potential of further reducing the manufacturer's overall costs. Moreover, because the ASM 170 is a potential source of loss variations, it's valuable that the RF module 200 can nullify the loss variations attributable to the ASM 170.

Figure 3:
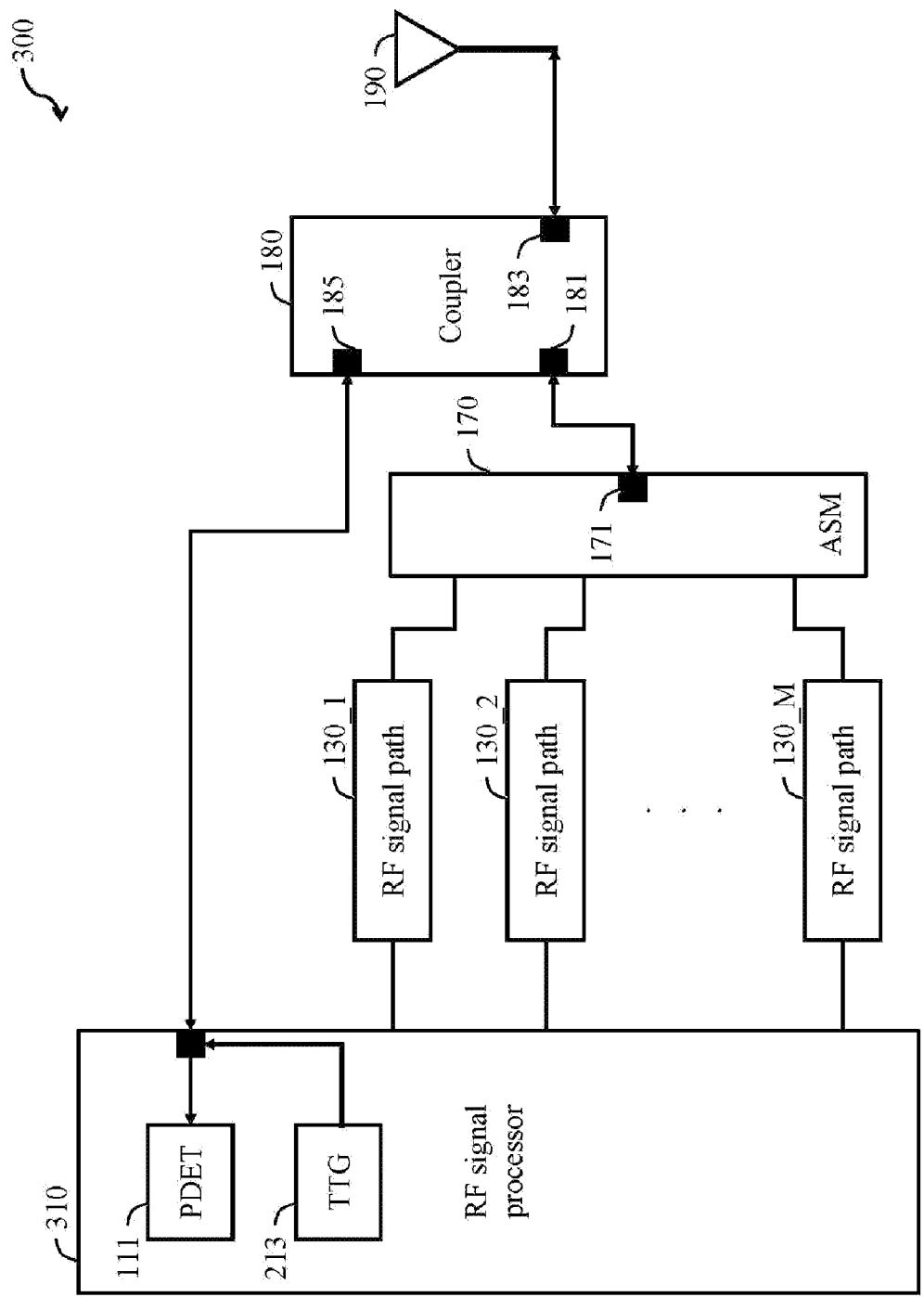

FIG. 3 shows a block diagram of an RF module according to a third embodiment of the invention. This embodiment combines the concepts and spirit of the first and second embodiments and has only a few differences from the first and second embodiments. For the sake of simplicity, only these differences will be discussed hereinafter.

Please refer to FIG. 3. An RF module 300 of this embodiment includes an RF signal processor 310. Instead of having either the power detector 111 or the test tone generator 213, the RF signal processor 310 has both. The RF signal processor 310 is an RF transceiver; the RF signal paths 130_1~130_M include at least one RF transmission path and at least one RF receiving path. If the power detector 111 and the test tone generator 213 cannot be connected together, the RF signal processor 310 can further include a switch that selects and connects only one of the power detector 111 and the test tone generator 213 to the coupled port 185 at a time, and isolates the power detector 111 and the test tone generator 213 from each other.

Similar to the RF module 100, the RF module 300 also allows RF transmission path(s) of the RF signal paths 130_1~130_M to be calibrated in real time. Similar to the RF module 200, the RF module 300 also allows RF receiving path(s) of the RF signal paths 130_1~130_M to be calibrated, especially after an electronic device incorporating the RF module 300 is already in an end user's hand. As a result, the RF module 300 combines the functions and advantages of both the RF modules 100 and 200.

Figure 4:
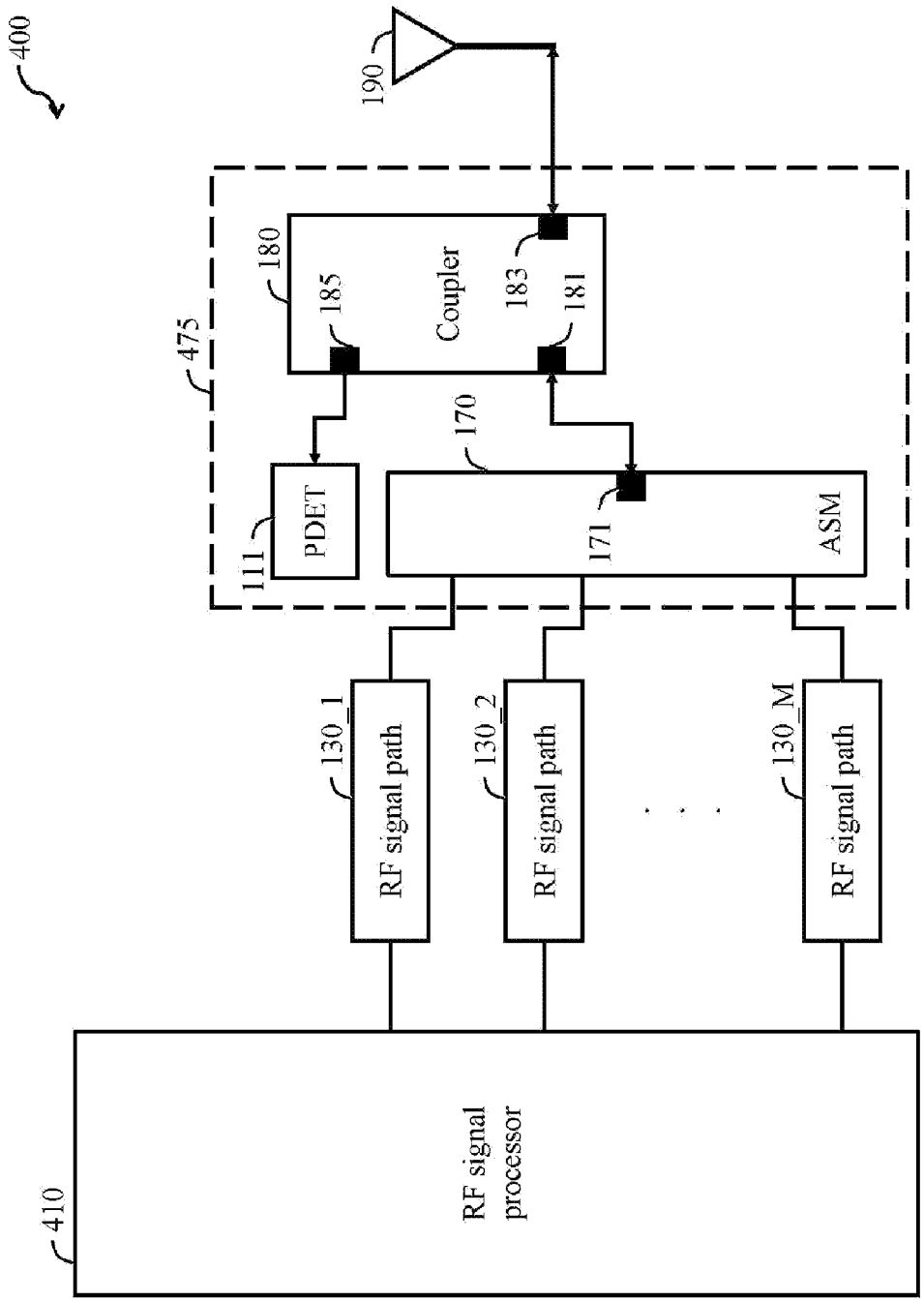

FIG. 4 shows a block diagram of an RF module according to a fourth embodiment of the invention. An RF module 400 of this embodiment includes an RF signal processor 410. The RF signal processor 410 can be either an RF transmitter or an RF transceiver. Instead of being an internal component of the RF signal processor 410, the power detector 111 is either a stand-alone component or an internal component of a module 475 that further incorporates the ASM 170 and the coupler 180. When the ASM 170 connects the RF transmission path 130_K to the antenna port 171, the power detector 111 can report its power detection results to a baseband circuitry that is connected to the RF signal processor 410. The baseband circuitry can then calibrate the RF transmission path 130_K and the ASM 170 according to the power detection results. Except for these differences, this embodiment is very similar to the embodiment shown in FIG. 1, and these two embodiments share several common advantages.

Because the power detector 111 is either a stand-alone component or an internal component of the module 475, the manufacturer of either the power detector 111 or the module 475, rather than the manufacturer of the RF signal processor 410, will bear the manufacturing costs of the power detector 111 and have to ensure that the power detector 111 has acceptable precision.

Figure 5:
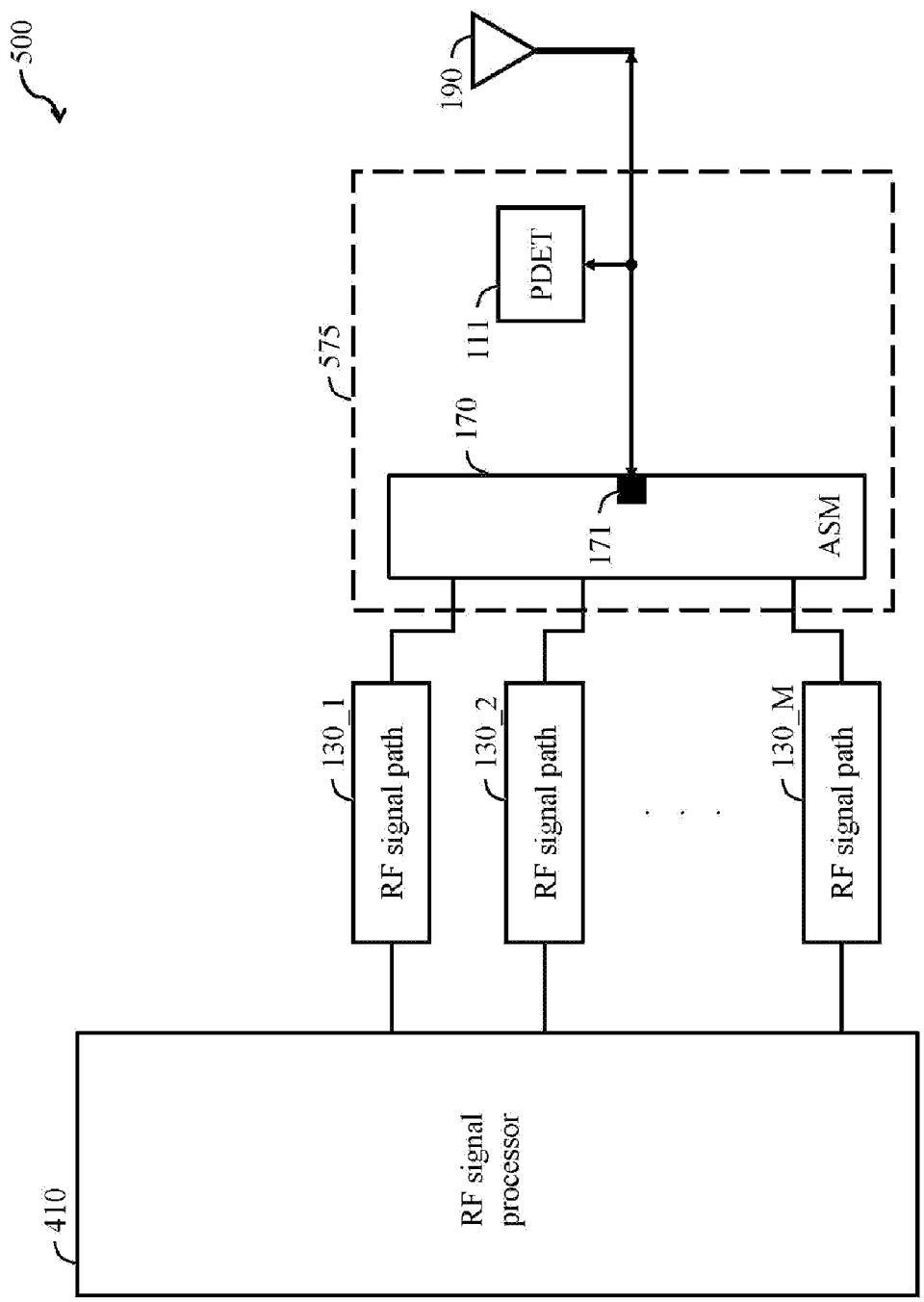

FIG. 5 shows a block diagram of an RF module according to a fifth embodiment of the invention. Instead of being connected to the ASM 170 through a coupler 180, the power detector 111 in this embodiment is connected to a path between the ASM 170 and the antenna 190. When the RF transmission path 130_K is in use, the ASM 170 connects it to the antenna port 171. The power detector 111 senses voltages on the path between the ASM 170 and the antenna 190 so as detect power of the RF transmission signals that have passed through the RF transmission path 130_K and the ASM 170. The power detector 111 can report its power detection results to a baseband circuitry that is connected to the RF signal processor 410, so that the baseband circuitry can calibrate the RF transmission path 130_K and the ASM 170 according to the power detection results. Except for these differences, this embodiment is very similar to the embodiment shown in FIG. 4, and these two embodiments share several common advantages.

Because the power detector 111 is either a stand-alone component or an internal component of a module 575 that further incorporates the ASM 170, the manufacturer of either the power detector 111 or the module 575, rather than the manufacturer of the RF signal processor 410, will bear the manufacturing costs of the power detector 111 and have to ensure that the power detector 111 has acceptable precision.

Figure 6:
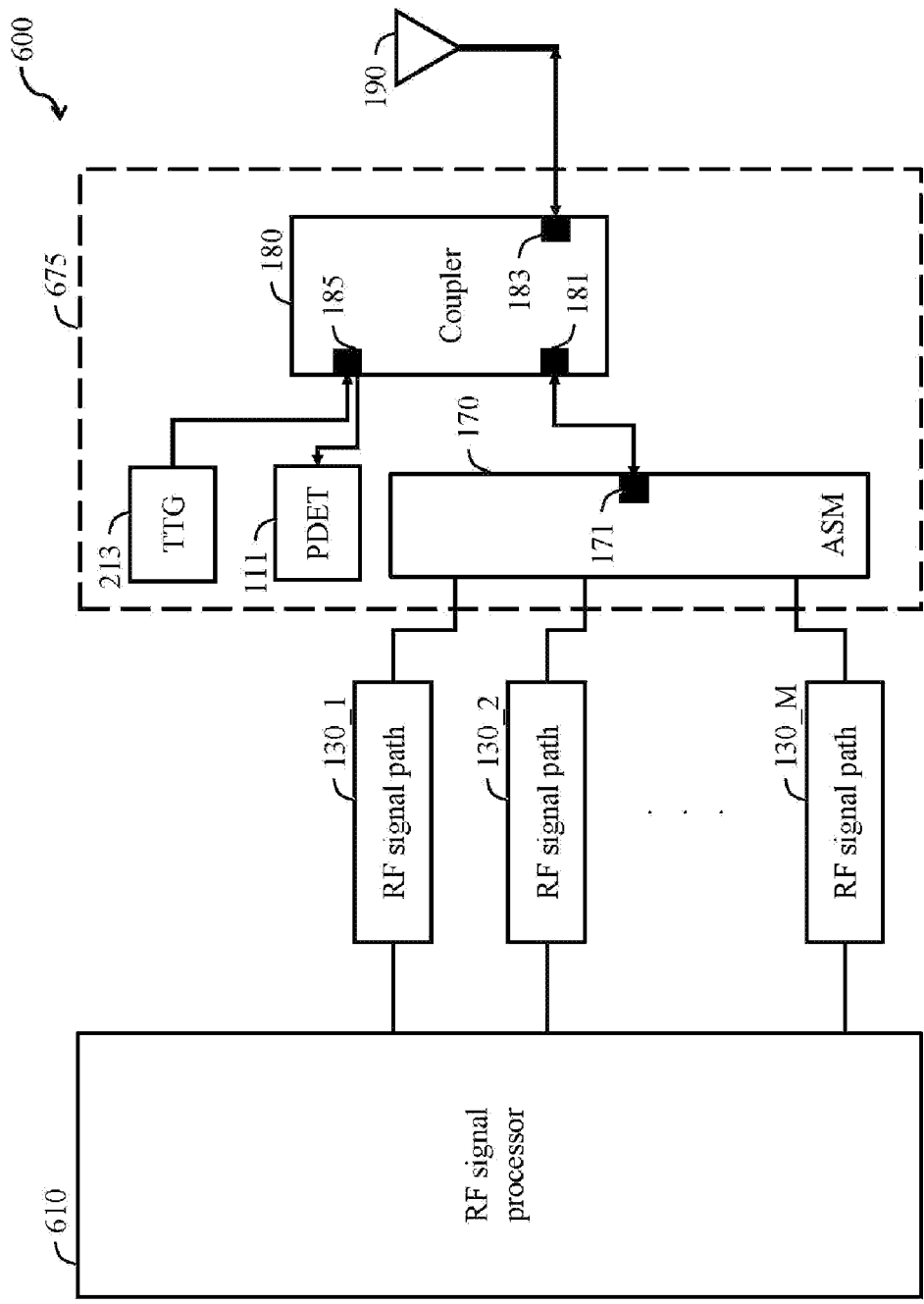

FIG. 6 shows a block diagram of an RF module according to a sixth embodiment of the invention. An RF module 600 of this embodiment includes an RF signal processor 610 that can be an RF transceiver. Instead of being internal components of the RF signal processor 610, the power detector 111 and the test tone generator 213 are either stand-alone components or internal components of a module 675 that further incorporates the ASM 170 and the coupler 180. When the ASM 170 connects the RF transmission path 130_K of the RF signal paths 130_1~130_M to the antenna port 171, the power detector 111 can report its power detection results to a baseband circuitry that is connected to the RF signal processor 610, so that the baseband circuitry can calibrate the RF transmission path 130_K according to the power detection results. Except for these differences, this embodiment is very similar to the embodiment shown in FIG. 3, and these two embodiments share several common advantages.

Because the power detector 111 and the test tone generator 213 are either stand-alone components or internal components of the module 675, the manufacturer(s) of either the power detector 111 and the test tone generator 213 or the module 675, rather than the manufacturer of the RF signal processor 610, will bear the manufacturing costs of the power detector 111 and the test tone generator 213 and have to ensure that these two components have acceptable precision.

Figure 7:
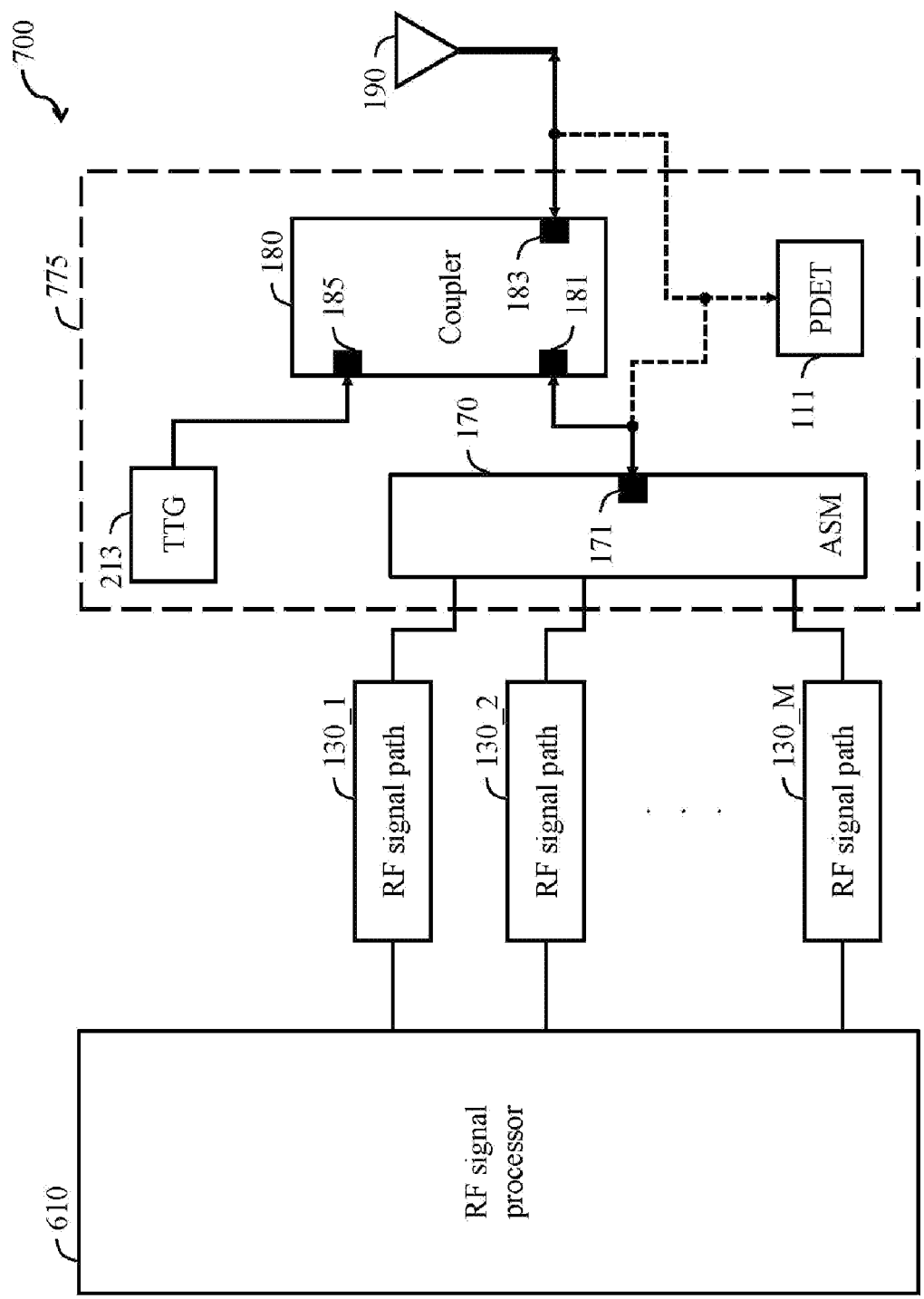

FIG. 7 shows a block diagram of an RF module according to a seventh embodiment of the invention. Instead of being connected to the coupled port 185 of the coupler 180, the power detector 111 is connected to either the path between the ASM 170 and the coupler 180, or the path between the coupler 180 and the antenna 190. When the RF transmission path 130_K is in use, the ASM 170 connects it to the antenna 190 through the coupler 180. The power detector 111 senses voltages on either the path between the ASM 170 and the coupler 180 or the path between the coupler 180 and the antenna 190 so as detect power of the RF transmission signals that have passed through the RF transmission path 130_K and the ASM 170.

Except for the aforementioned differences, this embodiment is very similar to the embodiment shown in FIG. 6, and these two embodiments share several common advantages. The manufacturer(s) of either the power detector 111 and the test tone generator 213 or a module 775 that incorporates these two components, the ASM 170, and the coupler 180, rather than the manufacturer of the RF signal processor 610, will bear the manufacturing costs of the power detector 111 and the test tone generator 213 and have to ensure that these two components have acceptable precision.

Figure 8:
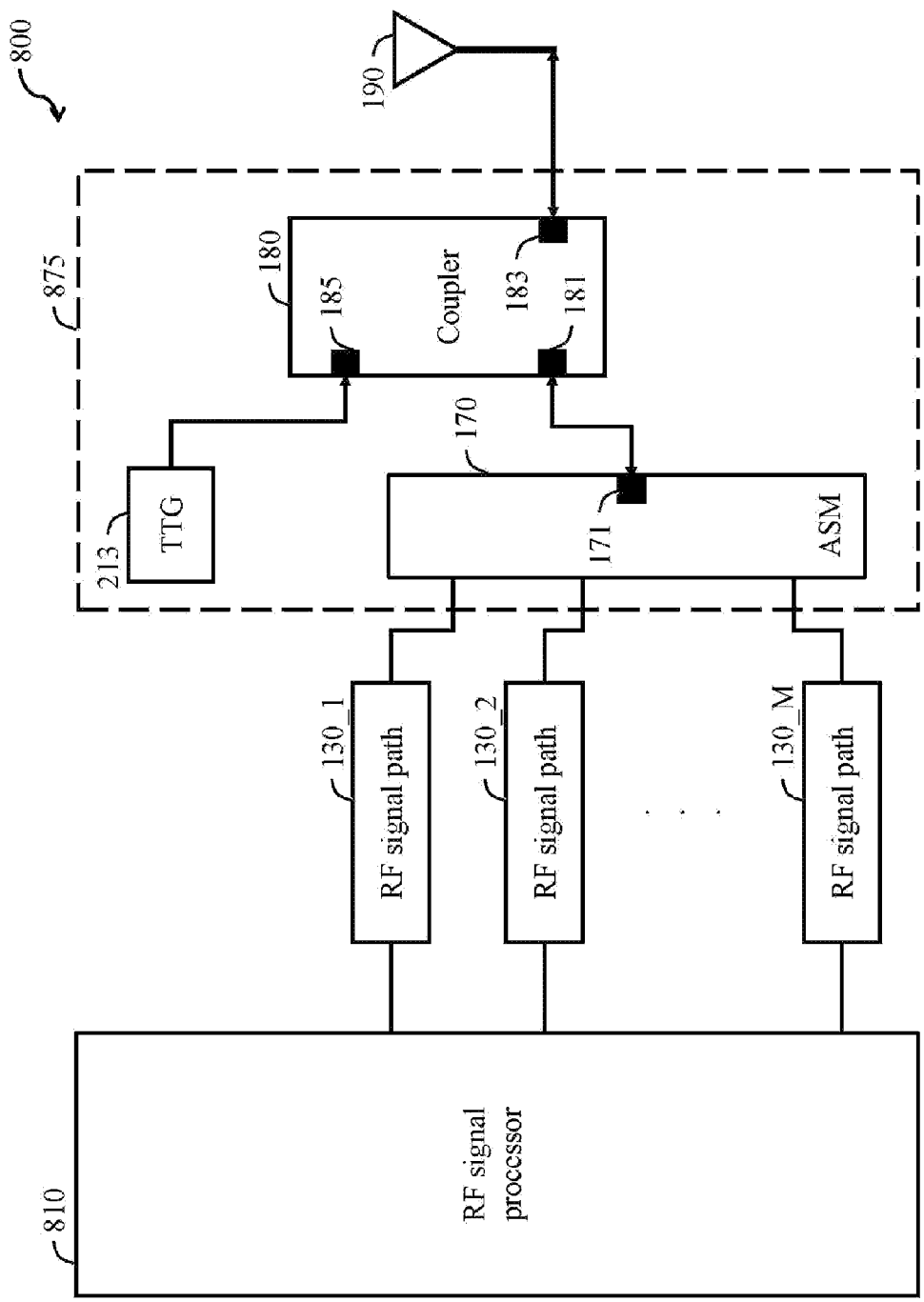

FIG. 8 shows a block diagram of an RF module according to an eighth embodiment of the invention. An RF module 800 of this embodiment includes an RF signal processor 810 that can be an RF transceiver or an RF receiver. Unlike the RF module 700 shown in FIG. 7, the RF module 800 of this embodiment includes a module 875 that does not have a power detector 111. Therefore, unlike the RF module 700, the RF module 800 may not allow the RF transmission path 130_K to be calibrated when the path 130_K is in use.

The embodiment shown in FIG. 8 shares some common advantages with the embodiment shown in FIG. 2. The manufacturer of the test tone generator 213 or the module 875 that incorporates the test tone generator 213, the ASM 170, and the coupler 180, rather than the manufacturer of the RF signal processor 810, will bear the manufacturing costs of the test tone generator 213 and have to ensure that this component has acceptable precision.

Figure 9:
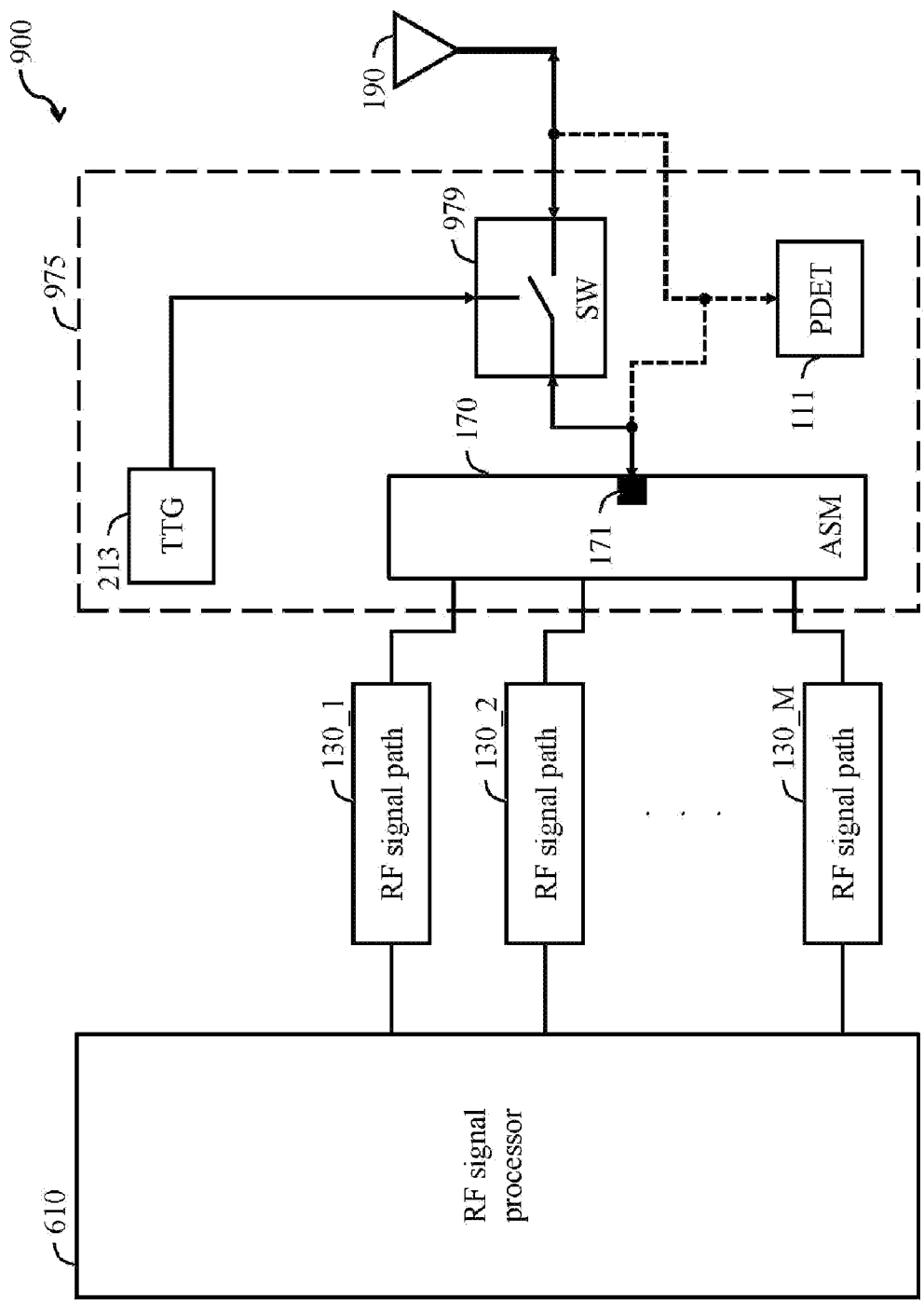

FIG. 9 shows a block diagram of an RF module according to a ninth embodiment of the invention. In this embodiment, a switch 979 rather than a coupler 180 is used. When the RF module 900 is in use, the switch 979 connects the antenna port 171 of the ASM 170 to the antenna 190. When the RF transmission path 130_K is in use, the ASM 170 and the switch 979 connect it to the antenna 190; the power detector 111 senses voltages on either the path between the ASM 170 and the switch 979 or the path between the switch 979 and the antenna 190 so as detect power of the RF transmission signals that have passed through the RF transmission path 130_K and the ASM 170. When the RF module 900 is not in use and the RF receiving path 130_L needs to be calibrated, the switch 979 connects the test tone generator 213 to the antenna port 171 of the ASM 170 so as to allow the test tone generator 213 to feed a test tone into the RF receiving path 130_L.

Except for the aforementioned differences, this embodiment is very similar to the embodiment shown in FIG. 7, and these two embodiments share several common advantages. The manufacturer(s) of either the power detector 111 and the test tone generator 213 or a module 975 that incorporates these two components, the ASM 170, and the switch 979, rather than the manufacturer of the RF signal processor 610, will bear the manufacturing costs of the power detector 111 and the test tone generator 213 and have to ensure that these two components have acceptable precision.

Figure 10:
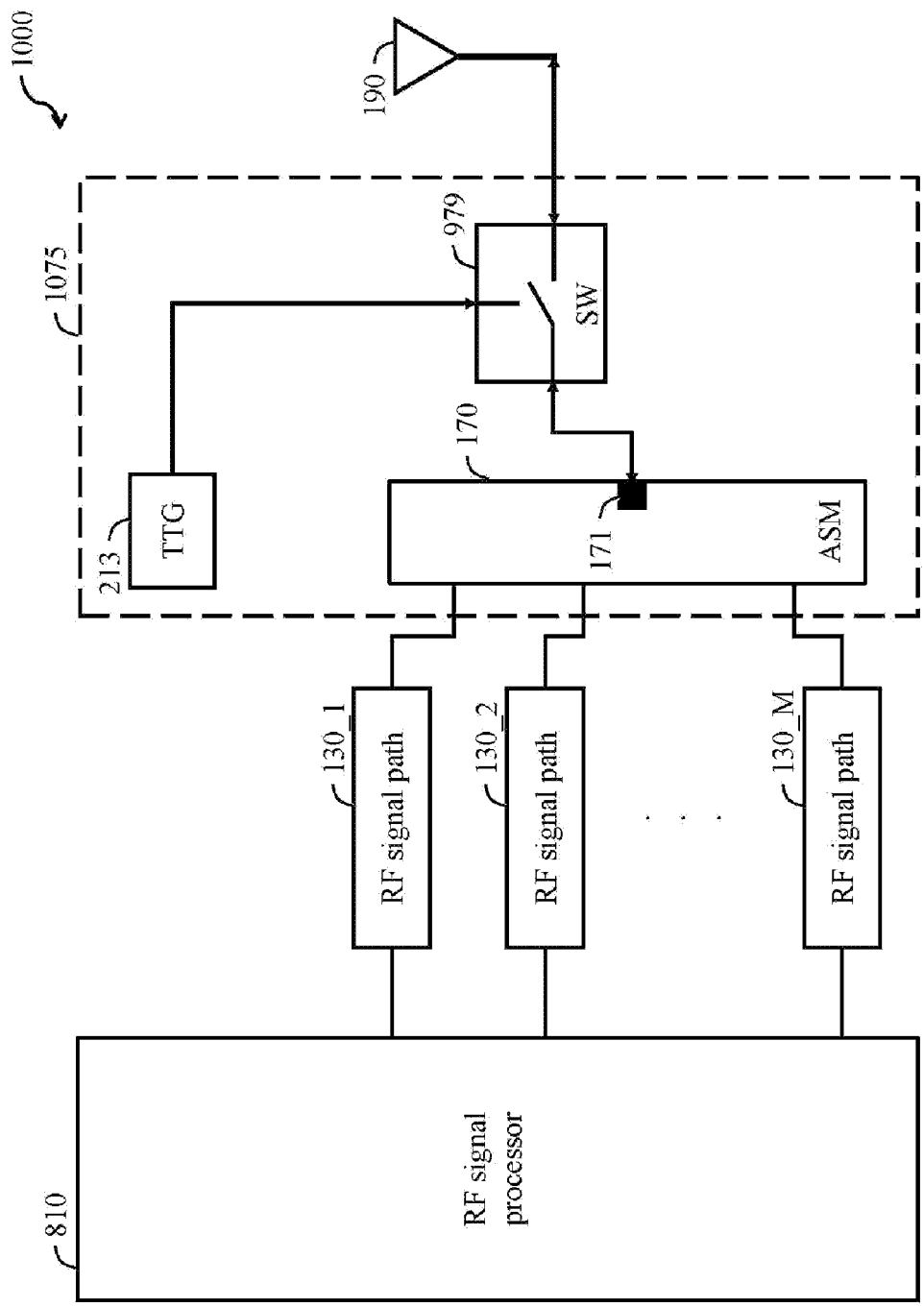

FIG. 10 shows a block diagram of an RF module according to a tenth embodiment of the invention. An RF module 1000 of this embodiment includes an RF signal processor 810 that can be an RF transceiver or an RF receiver. Unlike the RF module 900 shown in FIG. 9, the RF module 1000 of this embodiment includes a module 1075 that does not have a power detector 111. Therefore, unlike the RF module 900, the RF module 1000 may not allow the RF transmission path 130_K to be calibrated when the path 130_K is in use.

The embodiment shown in FIG. 10 shares several common advantages with the embodiment shown in FIG. 2. The manufacturer of the test tone generator 213 or the module 1075 that incorporates the test tone generator 213, the ASM 170, and the switch 979, rather than the manufacturer of the RF signal processor 810, will bear the manufacturing costs of the test tone generator 213 and have to ensure that this component has acceptable precision.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A radio frequency (RF) module, comprising:
    an RF signal processor;
    a plurality of RF signal paths connected to the RF signal processor;
    an antenna switch module (ASM) connected to the RF signal paths, the ASM including an antenna port and selectively connecting the RF signal processor to the antenna port through one of the RF signal paths; and
    a power detector, operative to detect power of an RF transmission signal that exits the antenna port of the ASM and enters an antenna when the ASM connects an RF transmission path of the RF signal paths to the antenna port of the ASM.

2. The RF module of claim 1, further comprising:
    a coupler, including an input port connected to the antenna port of the ASM, a transmitted port connected to the antenna, and a coupled port connected to the power detector.

3. The RF module of claim 2, further comprising:
a test tone generator, operative to generate a test tone and feed the test tone into the coupled port of the coupler when the ASM connects the antenna port to an RF receiving path of the RF signal paths.

4. The RF module of claim 1, wherein the power detector is connected to the antenna port of the ASM.

5. The RF module of claim 1, wherein the power detector is connected to the antenna.

6. The RF module of claim 1, further comprising:
a coupler, including an input port connected to the antenna port of the ASM, a transmitted port connected to the antenna, and a coupled port; and
a test tone generator, operative to generate a test tone and feed the test tone into the coupled port of the coupler when the ASM connects the antenna port to an RF receiving path of the RF signal paths;
wherein the power detector is connected to the antenna port of the ASM or the antenna.

7. The RF module of claim 1, further comprising:
a test tone generator; and
a switch, connected to the test tone generator, the antenna port of the ASM, and the antenna, operative to connect the antenna or the test tone generator to the antenna port of the ASM;
wherein the test tone generator is operative to generate a test tone and feed the test tone into the switch when the switch and the ASM connects the test tone generator to an RF receiving path of the RF signal paths, and the power detector is connected to the antenna port of the ASM or the antenna.

8. A radio frequency (RF) module, comprising:
an RF signal processor;
a plurality of RF signal paths connected to the RF signal processor;
an antenna switch module (ASM) connected to the RF signal paths, the ASM including an antenna port and selectively connecting the RF signal processor to the antenna port through one of the RF signal paths; and
a test tone generator, operative to generate a test tone and feed the test tone into the antenna port of the ASM when the ASM connects the antenna port to an RF receiving path of the RF signal paths.

9. The RF module of claim 8, further comprising:
a coupler, including an input port connected to the antenna port of the ASM, a transmitted port connected to an antenna, and a coupled port connected to the test tone generator.

10. The RF module of claim 9, further comprising:
a power detector, operative to detect power of an RF signal that exits the antenna port of the ASM and enters the antenna when the ASM connects an RF transmission path of the RF signal paths to the antenna port.

11. The RF module of claim 10, wherein the power detector is connected to the coupled port of the coupler.

12. The RF module of claim 10, wherein the power detector is connected to the antenna port of the ASM or the antenna.

13. The RF module of claim 8, further comprising:
a power detector; and
a switch, connected to the test tone generator, the antenna port of the ASM, and an antenna, operative to connect the antenna or the test tone generator to the antenna port of the ASM;
wherein the test tone generator feeds the test tone into the switch when the switch and the ASM connects the test tone generator to the RF receiving path of the RF signal paths, and the power detector is connected to the antenna port of the ASM or the antenna.

14. A radio frequency (RF) module, comprising:
an RF signal processor, comprising a calibration component;
a plurality of RF signal paths connected to the RF signal processor;
an antenna switch module (ASM) connected to the RF signal paths, the ASM including an antenna port and selectively connecting the RF signal processor to the antenna port through one of the RF signal paths; and
a coupler, including an input port connected to the antenna port of the ASM, a transmitted port connected to an antenna, and a coupled port connected to the calibration component of the RF signal processor;
wherein the calibration component of the RF signal processor facilitates the calibration of at least one of the RF signal paths.

15. The RF module of claim 14, wherein the calibration component is a power detector operative to detect power of a coupled RF signal that exits the coupled port of the coupler when the ASM connects an RF transmission path of the RF signal paths to the antenna port.

16. The RF module of claim 14, wherein the calibration component is a test tone generator operative to generate a test tone and feed the test tone into the coupled port of the coupler when the ASM connects the antenna port to an RF receiving path of the RF signal paths.

17. The RF module of claim 14, wherein the calibration component comprises:
a power detector, operative to detect power of a coupled RF signal that exits the coupled port of the coupler when the ASM connects an RF transmission path of the RF signal paths to the antenna port; and
a test tone generator, operative to generate a test tone and feed the test tone into the coupled port of the coupler when the ASM connects the antenna port to an RF receiving path of the RF signal paths.

* * * * *